United States Patent
Babazadeh et al.

(10) Patent No.: US 10,454,370 B2
(45) Date of Patent: Oct. 22, 2019

(54) THREE QUARTER BRIDGE FOR BUCK-DERIVED SWITCH-MODE POWER SUPPLIES

(71) Applicant: Alpha and Omega Semiconductor (Cayman) Limited, Grand Cayman (KY)

(72) Inventors: Amir Babazadeh, Laguna Hills, CA (US); Chris M. Young, Round Rock, TX (US)

(73) Assignee: Alpha and Omega Semiconductor (Cayman) Limited, Grand Cayman (KY)

( * ) Notice: Subject to any disclaimer, the term of this patent is extended or adjusted under 35 U.S.C. 154(b) by 0 days.

(21) Appl. No.: 16/103,745

(22) Filed: Aug. 14, 2018

(65) Prior Publication Data

US 2019/0288603 A1 Sep. 19, 2019

Related U.S. Application Data

(63) Continuation-in-part of application No. 16/029,407, filed on Jul. 6, 2018, now Pat. No. 10,243,449.

(Continued)

(51) Int. Cl.
*H02M 1/08* (2006.01)
*H02M 1/32* (2007.01)
(Continued)

(52) U.S. Cl.
CPC ............. *H02M 3/156* (2013.01); *H02M 1/08* (2013.01); *H02M 1/32* (2013.01); *H02M 3/07* (2013.01);
(Continued)

(58) Field of Classification Search
CPC .. H02M 1/08; H02M 1/32; H02M 2001/0054; H02M 3/07; H02M 3/156;
(Continued)

(56) References Cited

U.S. PATENT DOCUMENTS 5,929,692 A 7/1999 Carsten
6,271,651 B1 * 8/2001 Stratakos .............. H02M 3/158
323/282

(Continued)

OTHER PUBLICATIONS

Extended European Search Report in related Europe Application No. 19162239.8, dated Aug. 13, 2019, 8 pages.

*Primary Examiner* — William Hernandez
(74) *Attorney, Agent, or Firm* — Craige Thompson; Thompson Patent Law

(57) ABSTRACT

Some apparatus and associated methods relate to a three quarter bridge (TQB) applied across an output inductor of a buck-derived power converter, the TQB operated in a first mode such that when a high-side switch of the power converter is turned on, the TQB configured to pass a first controlled current to combine with a first output inductor current to a load, the TQB configured to control the first controlled current to minimize a negative voltage transient on the load, the TQB operated in a second mode such that when the high-side switch of the power converter is turned off the TQB configured to divert a second controlled current away from the load and to circulate the second controlled current through the output inductor, the TQB configured to control the second controlled current to minimize a positive voltage transient on the output of the power converter.

20 Claims, 12 Drawing Sheets

Related U.S. Application Data

(60) Provisional application No. 62/642,717, filed on Mar. 14, 2018.

(51) Int. Cl.
*H02M 3/156* (2006.01)
*H02M 7/219* (2006.01)
*H02M 3/158* (2006.01)
*H02M 3/07* (2006.01)

(52) U.S. Cl.
CPC .......... *H02M 3/1582* (2013.01); *H02M 7/219* (2013.01)

(58) Field of Classification Search
CPC .. H02M 3/1563; H02M 3/1566; H02M 3/157; H02M 3/1582; H02M 7/219
USPC ....... 323/247, 259, 355, 356, 357, 358, 363; 327/530, 538, 540, 541, 543, 588
See application file for complete search history.

(56) References Cited

U.S. PATENT DOCUMENTS

| | | | |
|---|---|---|---|
| 6,522,108 | B2 | 2/2003 | Prager et al. |
| 6,879,136 | B1* | 4/2005 | Erisman ................ H02M 3/156 323/224 |
| 8,575,910 | B2 | 11/2013 | Young |
| 9,178,420 | B1 | 11/2015 | Hawley |
| 9,787,179 | B1 | 10/2017 | Clarkin et al. |
| 2007/0096707 | A1 | 5/2007 | Xi |
| 2012/0081095 | A1 | 4/2012 | Kung |
| 2014/0125306 | A1 | 5/2014 | Babazadeh et al. |
| 2014/0300334 | A1* | 10/2014 | Popplewell .......... H03F 1/0227 323/282 |
| 2016/0049871 | A1* | 2/2016 | Ihs .......................... H02J 4/00 323/271 |
| 2016/0359411 | A1* | 12/2016 | Ihs ........................ H02M 3/158 |
| 2017/0187283 | A1* | 6/2017 | Vaidya ................. H02M 3/158 |

\* cited by examiner

US 10,454,370 B2

THREE QUARTER BRIDGE FOR BUCK-DERIVED SWITCH-MODE POWER SUPPLIES

CROSS-REFERENCE TO RELATED APPLICATIONS

This application is a Continuation-in-Part and claims the benefit of U.S. application Ser. No. 16/029,407 titled "Multifunction Three Quarter Bridge," filed by Chris M. Young on Jul. 6, 2018, which claims the benefit of U.S. Provisional Application Ser. No. 62/642,717 titled "Buck-Derived Switching Power Supply Techniques," filed by Chris M. Young on Mar. 14, 2018.

This application incorporates the entire contents of the foregoing application(s) herein by reference.

SUMMARY

Some apparatus and associated methods relate to a three quarter bridge (TQB) applied across an output inductor of a buck-derived power converter, the TQB operated in a first mode such that when a high-side switch of the power converter is turned on, the TQB configured to pass a first controlled current to combine with a first output inductor current to a load, the TQB configured to control the first controlled current to minimize a negative voltage transient on the load, the TQB operated in a second mode such that when the high-side switch of the power converter is turned off the TQB configured to divert a second controlled current away from the load and to circulate the second controlled current through the output inductor, the TQB configured to control the second controlled current to minimize a positive voltage transient on the output of the power converter.

Various embodiments may achieve one or more advantages. For example, some TQB operations may improve power supply stability, especially during transient step load events. In some instances, various TQB operations may provide improved performance with less output capacitance, reducing cost and size. In some exemplary power converter applications, resulting output voltages may include lower voltage deviation from nominal output voltage, and may include voltage deviations of less duration. Some implementations may provide increased undershoot and/or overshoot margins when compared against requirements for modern computing device loads.

DETAILED DESCRIPTION OF ILLUSTRATIVE EMBODIMENTS

Figure 1:
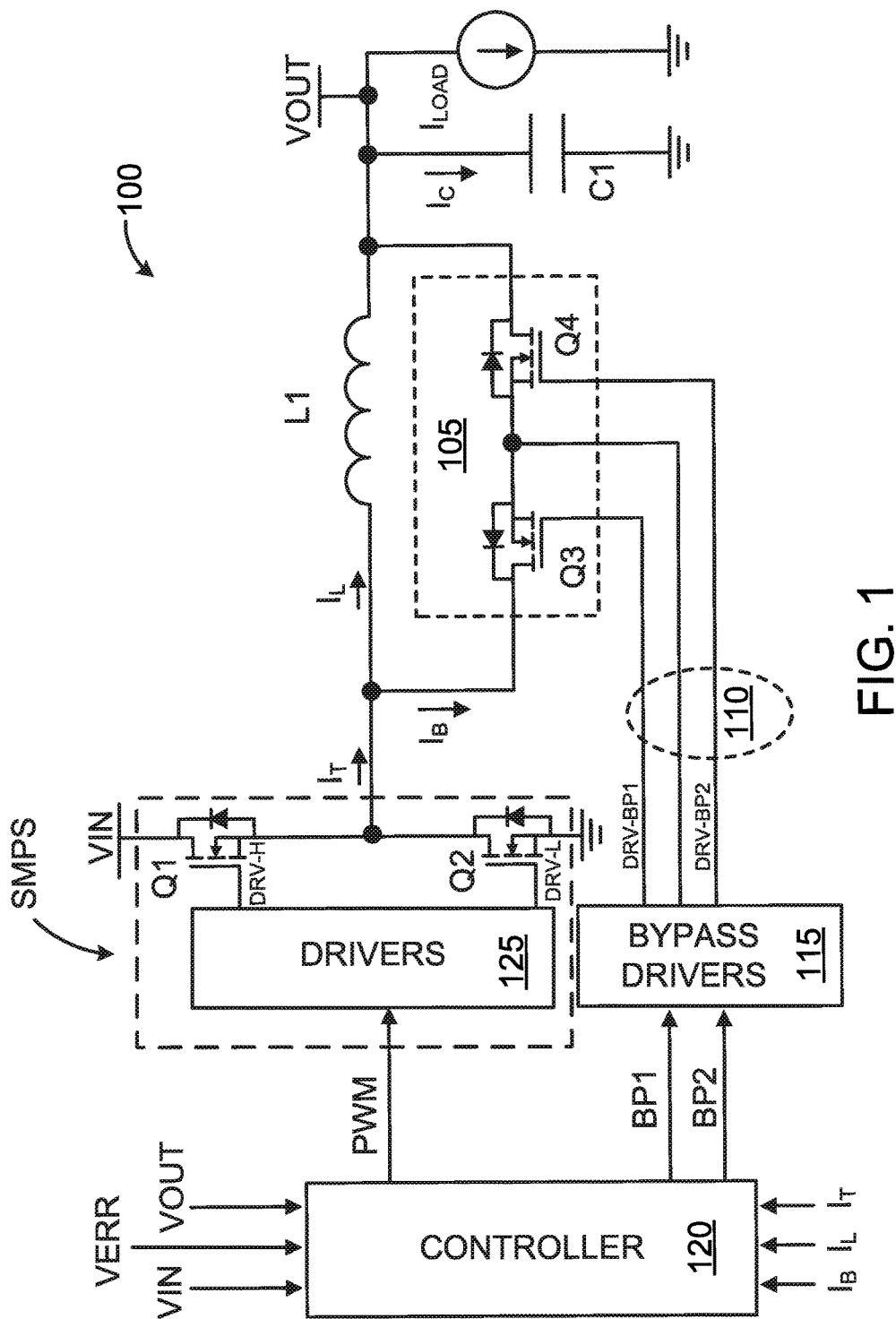
FIG. 1 depicts an exemplary switch-mode power supply circuit with an exemplary integrated three-quarter bridge.

FIG. 1 depicts an exemplary switch-mode power supply circuit with an exemplary integrated three-quarter bridge. A switch-mode power supply circuit 100 includes an integrated bypass switch 105. The bypass switch 105 is made up of field-effect transistors (FETs) Q3 and Q4. The bypass switch 105 is controlled by a set of TQB drive lines 110. The TQB drive lines are driven by a bypass driver circuit 115. The bypass driver circuit 115 is controlled by a switch-mode controller 120. The switch-mode controller 120 controls a switch-mode driver circuit 125. The switch-mode driver circuit 125 drives a high-side FET Q1 and a low-side FET Q2. The high-side FET Q1 and low-side FET Q2 drive an output inductor L1. The output inductor L1 supports an output capacitor C1 and an output load $I_{LOAD}$. The output capacitor C1 may be indicative of an output capacitor bank. The switch-mode controller 120 receives current sense signals $I_T$, $I_B$ and $I_L$.

$I_B$ may be the bypass current passing through the bypass switch. In some operations, the bypass current $I_B$ may be positive and may be a supporting current to help boost a negative output voltage transient. In some operations, the bypass current $I_B$ may be negative and may be a circulating current to help divert current away from an output voltage transient that is rising due to receiving excessive current from the switch-mode power supply.

The switch-mode controller 120 also receives voltage sense signals VIN (e.g., input bulk voltage supply) and VOUT (e.g., output voltage supply). In various examples, the switch-mode controller 120 receives a voltage error signal VERR which may, for example, reflect the difference between VOUT and a stable reference voltage. With reference to FIG. 1, the switch-mode controller 120 controls an output PWM signal and BP1/BP2 signals (e.g., the signals delivered to the drivers 125, 115) based on a function of the received current and voltage signals. In response to receiving the respective signals PWM and BP1/BP2, the drivers 125, 115 generate respective output gate signals DRV-H/DRV-L and DRV-BP1/DRV-BP2. In various examples, the driver 115 may be integrated/packaged with the bypass switch 105, such that the two form a single integrated circuit unit. In some embodiments, the driver 115 may be a separate component from the bypass switch 105, such that the two are distinct elements of the circuit 100.

During a step-up transient or loading event on $I_{LOAD}$, with a high-side FET switch Q1 active (e.g., "boost mode"), the bypass switch 105 may be controlled via the TQB control lines 110 to draw additional current $I_B$ (where $I_B>0$) from VIN, $I_B$ in parallel with the output inductor L1. The additional current $I_B$ may advantageously support an output voltage supply VOUT, substantially reducing a negative voltage transient (undershoot) on output voltage supply VOUT. For example, during the boost mode, the switch-mode controller 120 may set Q1, Q3, and Q4 to the on state, which permits the currents $I_B$ and $I_L$ to both provide power at VOUT.

Conversely, during a step-down transient or unloading event on $I_{LOAD}$, with FET switch Q1 off (e.g., "sink mode"), the bypass switch 105 may be controlled via the TQB control lines 110 to redirect a portion of the output inductor current $I_L$, through the bypass switch 105 instead of the load $I_{LOAD}$. The bypass current $I_B$ (where $I_B<0$) may be advantageously diverted away from the load and away from the output voltage supply VOUT, substantially reducing a positive voltage transient on output voltage supply VOUT. For example, during the sink mode, the switch-mode controller 120 may set Q2 and Q1 to a Hi-Z (off) state (or Q2 in an on/active state), which aids in diverting the current $I_B$ from the load while circulating the current $I_L$ through the bypass switch 105.

In some implementations, in the sink mode there may be at least two options. For the first option, Q2 is on and Q3 and Q4 are on. In this case, a portion of the energy is dissipated in the bypass branch, and a portion of the current goes back to ground through the low-side FET Q2. In this case, the voltage over the inductor may be approximately −VOUT. For the second option, both Q1 and Q2 are off (e.g., Hiz mode), so the inductor current $I_L$ can circulate inside the loop formed by Q3, Q4, and L1, and at least a portion of the energy (depending on the Rdson of Q3 and Q4) is dissipated and at the end the rest goes to the load. In this second option, for example, no part (or a negligible amount) of the current may go back to the source or the ground via Q1 or Q2.

In various examples, the value of the bypass current $I_B$ may be controlled by the gate-to-source voltage VGS of the FETs Q3 and Q4. The VGS may be controlled by various methods. VGS control methods suitable for controlling current through FETs Q3 and Q4 may be described, for example, with reference to FIG. 6.

In some implementations, the bypass current $I_B$ may be dynamically sensed by various methods. A current sense method of a controller, such as switch-mode controller 120, may be used in combination with the bypass current sense to determine (e.g., by calculation) the current flowing through the output inductor L1 and/or the FETs Q3 and Q4. Determination of output inductor current $I_L$ as a function of an input supply current minus the bypass current $I_B$ may, for example, overt a false over-current protection (OCP) shut-off event.

In various examples, Q3 and Q4 may be considered as a current source. Various operating modes may utilize Q3 and Q4 in the linear operating regions, so they perform as a current source. Control operations may be performed, for example, by the switch-mode controller 120, to perform controlling the bypass circuit in the TQB converter. Various methods are disclosed herein for adjusting the phase current sensing, as well as for reducing the voltage transient tail after the transient events. Various embodiments may configure the optimal levels of current (e.g., not too much or too little current) provided to a load.

In some examples, the controller may not receive $I_B$, $I_L$, and/or $I_T$. For example, since $I_T=I_B+I_L$, if an integrated current sensing method is employed, $I_T$ may be sensed by the power stage, and $I_B$ may be sensed by the bypass. For discrete DCR current sensing, $I_L$ and $I_B$ can be sensed, so in some examples, $I_L$ and $I_B$ may not be delivered/inputted to the controller. In some examples, $I_B$ and $I_L/I_T$ may be input to the controller, depending on the current sensing method.

In some embodiments, a low-side switch, such as the low-side switch Q2 of FIG. 1, may be implemented, for example, as a freewheeling rectifier. In some implementations, a freewheeling rectifier may, by way of example and not limitation, include synchronous rectifiers, Schottky diodes, high-speed rectifiers, general rectifiers and/or body diodes intrinsic within various transistors (e.g., FETs).

Figure 2:
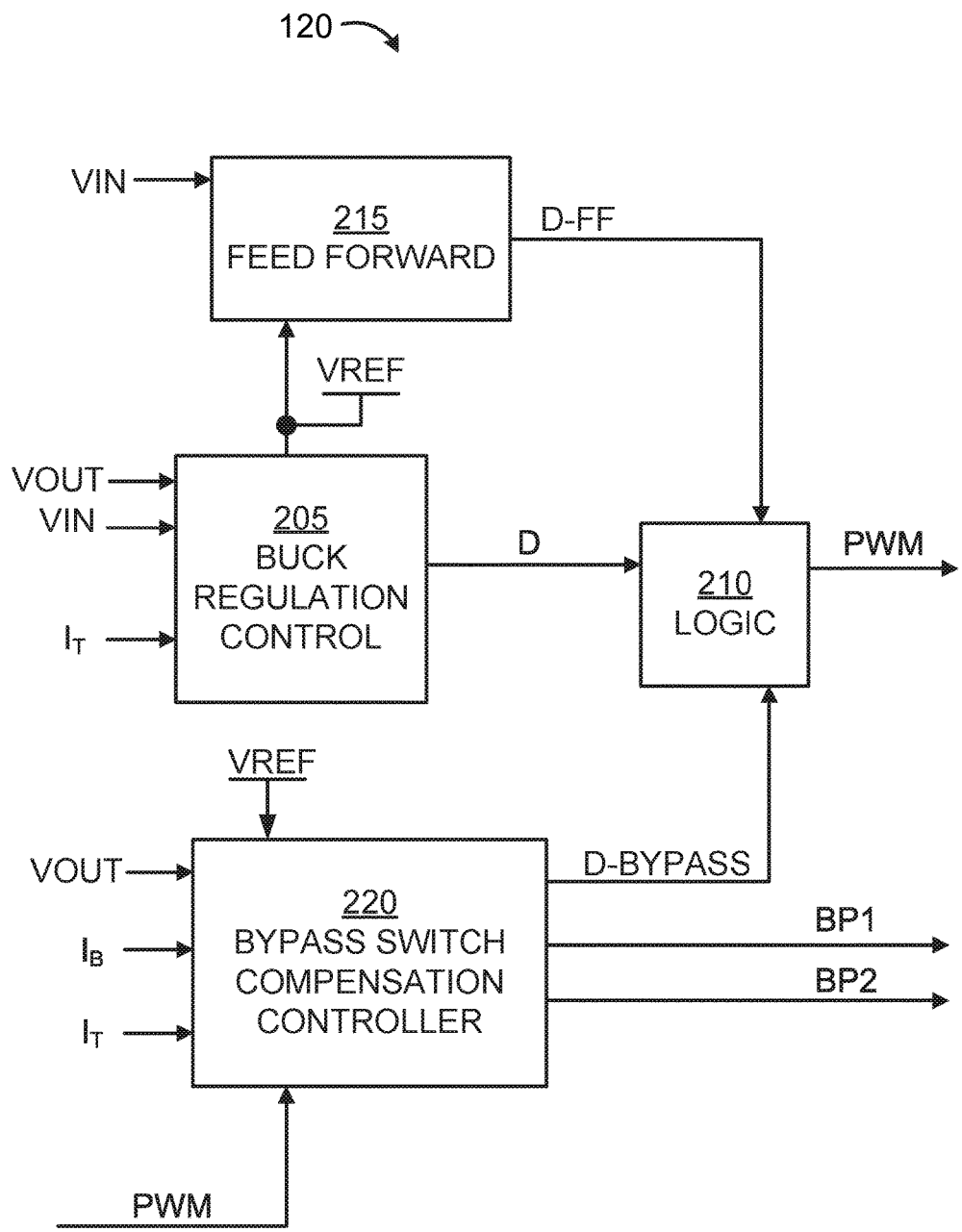
FIG. 2 depicts an exemplary switch-mode power supply controller with integrated control for a three-quarter bridge.

FIG. 2 depicts an exemplary switch-mode power supply controller with integrated control for a three-quarter bridge. This exemplary switch-mode controller 120 includes a buck regulation control circuit 205. The buck regulation control circuit 205 receives the voltage sense signal VOUT (FIG. 1) from the output of the switch-mode power supply 100, of which the switch-mode controller 120 is controlling. The buck regulation control circuit 205 receives the voltage sense signal VIN (FIG. 1) from a bulk power supply. The buck regulation control circuit 205 receives a current sense signal $I_T$ (FIG. 1). The voltage sense signals VOUT, VIN and the current sense signal $I_T$ are processed by the buck regulation control circuit 205 to produce a drive signal D. In the depicted example, the buck regulation control circuit 205 produces an internal reference voltage signal VREF. In some examples, the buck regulation control circuit 205 receives the reference voltage signal VREF externally, such that the user may determine the value of the output voltage supply VOUT. In the depicted example of FIG. 1 and FIG. 2, the value of the reference voltage signal VREF is predetermined and generated internally to the buck regulation control circuit 205.

The drive signal D is received by a logic circuit 210. The logic circuit 210 also receives a feed-forward drive signal D-FF and a bypass switch compensation drive signal D-BYPASS. The logic circuit 210 combines the feed-forward drive signal D-FF, the drive signal D, and the bypass switch compensation drive signal D-BYPASS to produce PWM signal for a high-side and low-side FET switch (such as FET switches Q1 and Q2 of FIG. 1) of a switch-mode power supply circuit (such as the switch-mode power supply circuit 100 of FIG. 1).

In some examples the logic circuit 220 may combine all signals together (D, D_FF, and D-bypass) and generate a final duty cycle signal D_final to determine the PWM signal. In some exemplary implementations, the final duty cycle signal D_final (with all adjustments) may go to a PWM generator for the driver 125, and the driver 125 in turn generates HS (Q1) and LS (Q2) gate signals. In some examples, the entire package of the driver 125 and the switches Q1 and Q2 may be referred to as an SMPS block. By way of example and not limitation, some embodiments may combine the duty cycle signal D_final in the logic 210 and the output of the logic 210 may be the PWM signal.

The feed-forward drive signal D-FF is generated by a feed-forward circuit 215. The feed-forward circuit 215 receives the voltage sense signal VIN from the bulk power supply. The feed-forward circuit 215 receives the reference voltage signal VREF generated by the buck regulation control circuit 205. Examples of feed-forward circuits that may be suitable for some embodiments are described, for example, in FIG. 1, item 118, in U.S. patent application Ser. No. 13/670,868, titled "Switching Regulator Control with Nonlinear Feed-Forward Correction," filed by Babazadeh, et. al., on Nov. 7, 2012, the entire contents of which is hereby incorporated by reference.

The bypass switch compensation drive signal D-BYPASS is generated by a bypass switch compensation controller 220. The bypass switch compensation controller 220 receives the output voltage supply sense signal VOUT from the output of the switch-mode power supply 100, of which the switch-mode controller 120 is controlling. The bypass switch compensation controller 220 receives the PWM signal generated by the logic 210. In some examples, the bypass switch compensation controller 220 may receive the drive signal D instead of the PWM signal generated by the logic 210. The bypass switch compensation controller 220 receives a bypass current sense signal $I_B$ which may be indicative of, for example, the bypass current $I_B$, with reference to FIG. 1. The bypass switch compensation controller 220 receives the current sense signal $I_T$ (FIG. 1), which may be indicative of a load demand of a supplied load. The bypass switch compensation controller 220 receives the reference voltage signal VREF. The bypass switch compensation controller 220 processes the input signals (e.g., in the depicted example, output voltage supply VOUT and bypass current $I_B$) to produce the bypass switch compensation drive signal D-BYPASS and a set of bypass signals BP1 and BP2 which are received by the bypass drivers 115 to generate the bypass drive signals DRV-BP1, DRV-BP2. The bypass drive signals DRV-BP1 and DRV-BP2 may be a gate-to-source voltage drive signal (VGS) to a bypass switch, for example, the VGS on the gates of FETs Q3 and Q4 of bypass switch, such as the bypass switch 105.

In various transient loading examples, a bypass switch, such as the bypass switch 105, may be outside of a control loop controlled by the buck regulation control circuit 205. The bypass switch compensation controller 220 may compensate for the actions of the bypass switch. For example, the bypass switch compensation controller 220 may include an internal determination of a gain factor Kg. In various examples, Kg may be determined as a function of the bypass current $I_B$ and the pulse width modulation (PWM). In various examples, the gain factor Kg may be a function of the gate-to-source voltage drive signal (VGS) and the PWM, where VGS is applied, for example, across a gate-to-source of a FETs Q3 and Q4 of various bypass switches.

The PWM signal may shrink (e.g., reduce duty cycle) or expand (e.g., increase duty cycle) as a function of the bypass switch compensation drive signal D-BYPASS. The amount of shrinking or expanding may depend on the amount of extra charge applied to the load through the bypass switch 105. For example, if the bypass current $I_B$ is used to charge the output (e.g., $I_B>0$) then there may be a need to add to the total duty cycle and expand the pulse after bypass switch turns off. In another example, if the TQB is in sink mode, there may be a need to shrink the regular pulse after the bypass switch is turned off. A gain factor (Kg<1 for shrinking and Kg>1 for expanding) may be applied to a duty cycle correction where:

$$K_g = f(V_{GS}, PWM)$$

In some examples, the bypass switch compensation drive signal D-BYPASS may be generated by the bypass switch compensation controller 220 based on a look-up table or formula. The look-up table or formula/function may use the PWM signal to determine the mode to employ (e.g., support mode or divert mode with reference to FIGS. 3A and 3B). The look-up table or formula/function may use the value of the bypass current $I_B$ and/or the value of the VGS to determine the strength of the bypass current. The look-up table or formula/function may use the output voltage supply VOUT to control the temporal duration of the bypass current $I_B$. In various examples, the bypass switch compensation drive signal D-BYPASS may be corrected using the gain factor Kg.

Figure 3A:
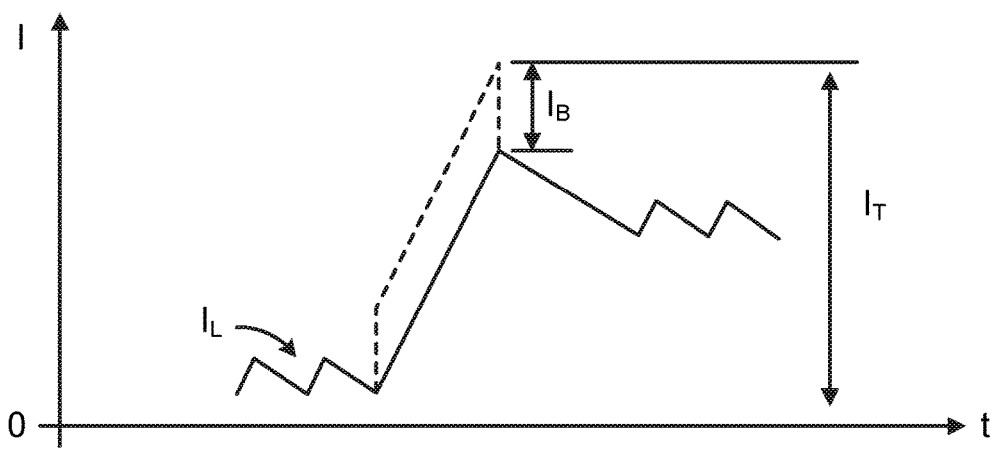
FIG. 3A depicts a support mode switching waveform of a switch-mode power supply circuit with an exemplary integrated three-quarter bridge.

FIG. 3A depicts a support mode switching waveform of a switch-mode power supply circuit with an exemplary integrated three-quarter bridge. In a support mode, with reference to FIG. 1 and FIG. 3A, during a step-up transient load event on $I_{LOAD}$, with FET switch Q1 active (e.g., "boost mode"), the bypass switch 105 may be activated via the TQB control lines 110 to draw additional current $I_B$ (where $I_B>0$) from VIN, through the bypass switch 105, in parallel with the output inductor L1. The additional current $I_B$ may advantageously support an output voltage supply VOUT, substantially reducing an undershoot (negative) voltage transient on output voltage supply VOUT. The amount of current $I_B$ through the bypass switch 105 may be dependent on the gate to source voltage VGS applied to FETs Q3 and Q4. As depicted in FIG. 3A, the current $I_B$ combines with the inductor current $I_L$ to produce a total current $I_T$ to an output load.

Figure 3B:
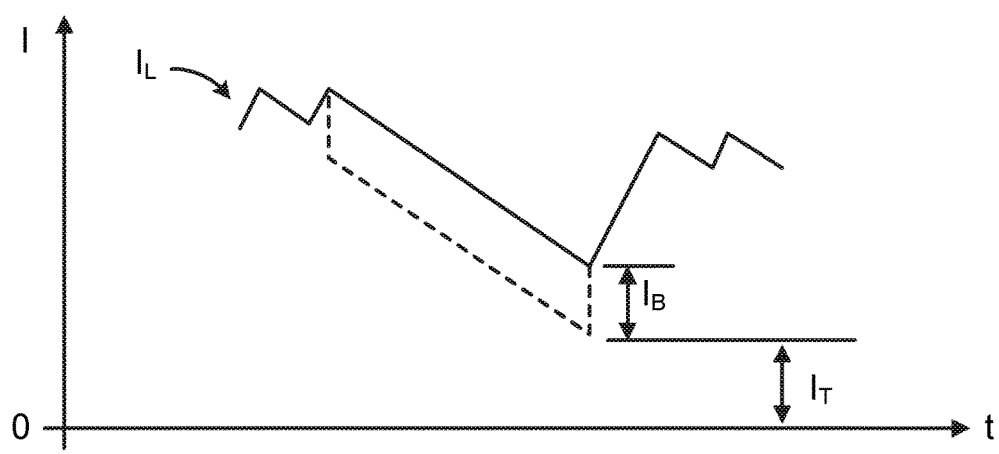
FIG. 3B depicts a divert mode switching waveform of a switch-mode power supply circuit with an exemplary integrated three-quarter bridge.

FIG. 3B depicts a divert mode switching waveform of a switch-mode power supply circuit with an exemplary integrated three-quarter bridge. In a divert mode, with reference to FIG. 1 and FIG. 3B, during a step transient unloading event on $I_{LOAD}$, with FET switch Q1 off (e.g., "sink mode"), the bypass switch 105 may be activated via the TQB control lines 110 to redirect a portion of the output inductor current $I_L$, through the bypass switch 105 instead of the load $I_{LOAD}$. The bypass current $I_B$ (where $I_B<0$) may be advantageously diverted away from the load and away from the output voltage supply VOUT, substantially reducing a positive voltage transient (overshoot) on the output voltage supply VOUT. The amount of current $I_B$ through the bypass switch 105 may be dependent on the gate to source voltage VGS applied to FETs Q3 and Q4. As depicted in FIG. 3B, the current $I_B$ subtracts from the inductor current $I_L$ to produce a total current $I_T$ to an output load. In this case, the low side Q2 may be in an on state.

Figure 3C:
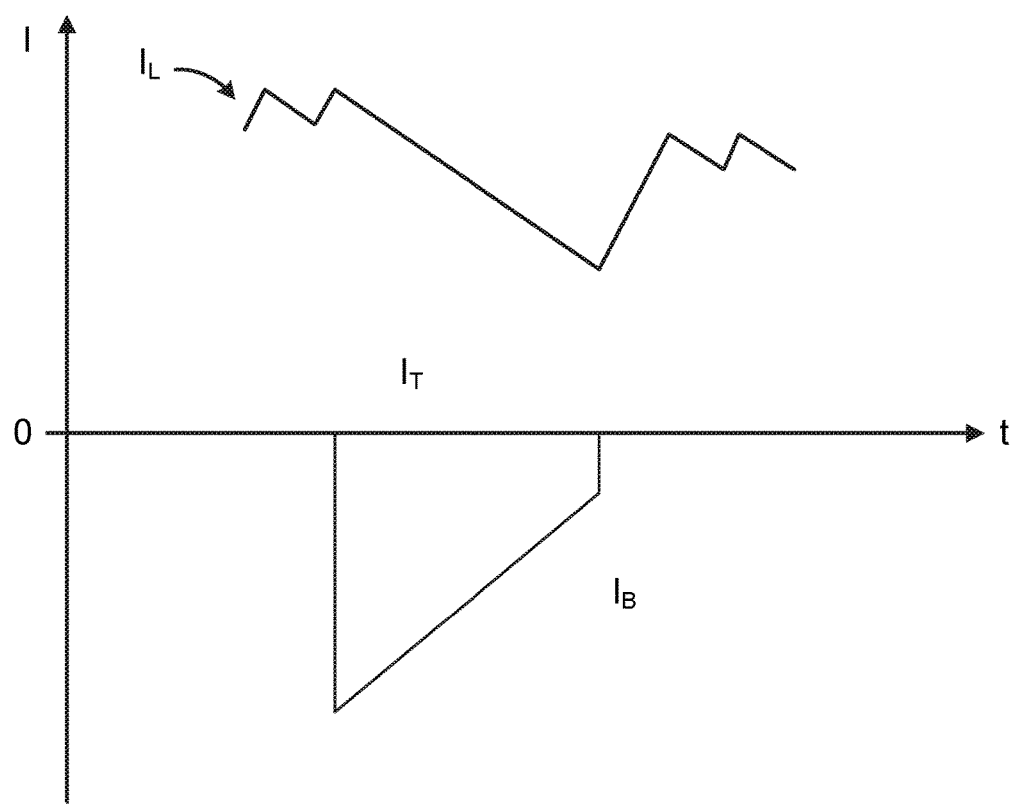
FIG. 3C depicts an exemplary divert mode.

FIG. 3C depicts an exemplary divert mode. In the exemplary scenario depicted in FIG. 3C, Q1 and Q2 are in an off state (e.g., in Hiz mode) and the inductor current $I_L$ is circulated inside the loop formed by Q3, Q4, and L1. In such a situation, some of the energy or power may be dissipated by the resistance of the switches, so the level of the current may drop. In this example, $I_T$ may be substantially zero (e.g., since $I_L$ and $I_B$ may be equal but opposite values).

With reference to FIGS. 3A and 3B, the switch-mode controller 120 may add/subtract the bypass current $I_B$ sensed in the bypass switch 105 to/from the current h-through the high-side switch FET Q1 and/or the low-side switch FET Q2. In various implementations, the controller may estimate the bypass current $I_B$ based on an applied VGS by the controller to the FETs Q3 and Q4. The estimate of the bypass current $I_B$ may be a function of the resistance of the FETs Q3 and Q4 and a supply voltage VIN. The bypass current $I_B$ may, for example, be determined by look-up table or by an equation, alone or in combination (e.g., $I_B=f(VGS)$). In some embodiments, the resistance of the FETs may be determined as a function of the applied VGS and may be determined by look-up table or by an equation, alone or in combination. In various examples, the bypass current $I_B$ in the bypass switch 105 may be measured from a current mirror on one or both of the FETs Q3 and/or Q4.

Figure 4:
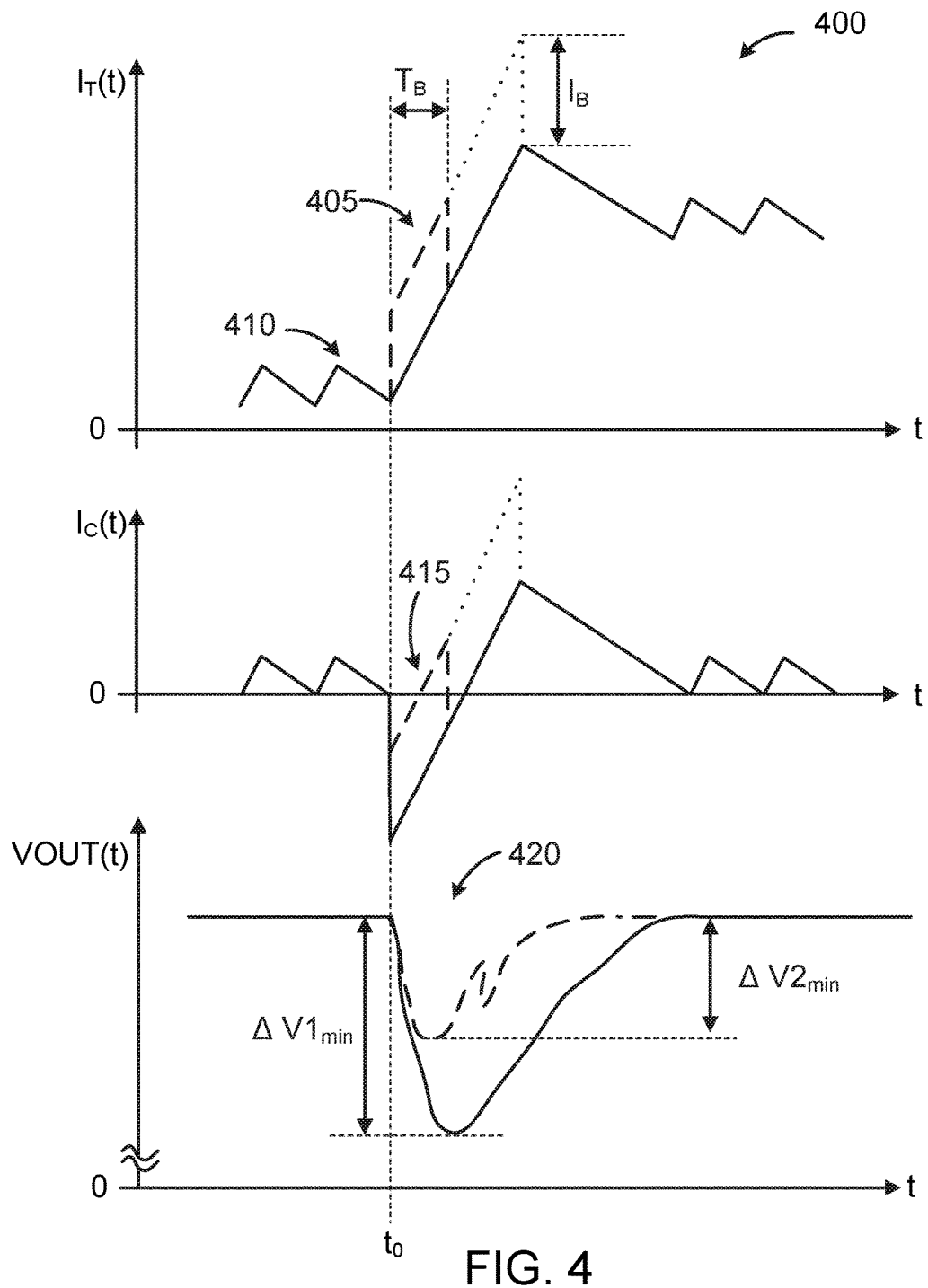
FIG. 4 depicts an exemplary set of waveforms illustrating control of current through a three-quarter bridge (TQB) during a step-up transient loading event.

FIG. 4 depicts an exemplary set of waveforms illustrating control of current through a three-quarter bridge (TQB) during a step-up transient loading event. A set of waveforms 400 includes (with reference to FIG. 1) a total power supply current $I_T(t)$, a capacitor current $I_C(t)$ and an output voltage supply VOUT(t) of a switch-mode power supply circuit, such as the switch-mode power supply circuit 100 (FIG. 1), with an integrated TQB, such as the bypass switch 105 (FIG. 1).

The step-up transient loading event may be a sudden and substantially large step increase in load current. The switch-mode power supply reaction to the step-up transient load is depicted in FIG. 4, where the load step occurs at $t_0$.

As shown in the depicted exemplary set of waveforms 400, the bypass switch 105 is controlled to turn on a bypass current $I_B(t)$ 405. The bypass current 405 adds to an inductor current $I_L(t)$ 410 to produce a total current $I_T(t)$. The bypass switch 105 is controlled to turn on the bypass current 405 for a controlled amount of bypass on-time $T_B$. As depicted in the capacitor current $I_C(t)$ waveform, the capacitor C1 (FIG. 1) receives at least a portion 415 of the bypass current 405. As depicted in the output voltage supply VOUT(t) waveform, the output voltage drops in response to the negative capacitor current supplying the transient step-up load. Without the bypass switch 105, the output voltage supply VOUT drops by, for example, $\Delta V1_{min}$. With the bypass switch 105, the output voltage supply VOUT drops by, for example, $\Delta V2_{min}$. Accordingly, the addition of the bypass current $I_B(t)$ 405 to the total current $I_T(t)$ may advantageously reduce the magnitude of a transient response 420.

The controlled amount of bypass on-time $T_B$ may be adjusted to minimize the transient response 420. In some implementations, the magnitude $I_B$ of the bypass current 405 may be controlled, to minimize the transient response 420. The magnitude $I_B$ of the bypass current 405 may be controlled by controlling the gate to source voltages VGS on the FETs in the TQB, for example, FETs Q3 and Q4 in the bypass switch 105, with reference to FIG. 1. Control of the bypass on-time $T_B$ may be implemented alone or in combination with the control of the magnitude $I_B$ of the bypass current 405 to control the transient response 420. The two controlled parameters, bypass on-time $T_B$ and magnitude of $I_B$, may be a function of the step-up transient load current magnitude, for example, $I_{LOAD}$ (FIG. 1). The two controlled parameters may be determined, for example, by a function or by look-up table (e.g., by the switch-mode controller 120). In various examples, the controlled parameters may be predetermined, for example, a fixed value.

Figure 5:
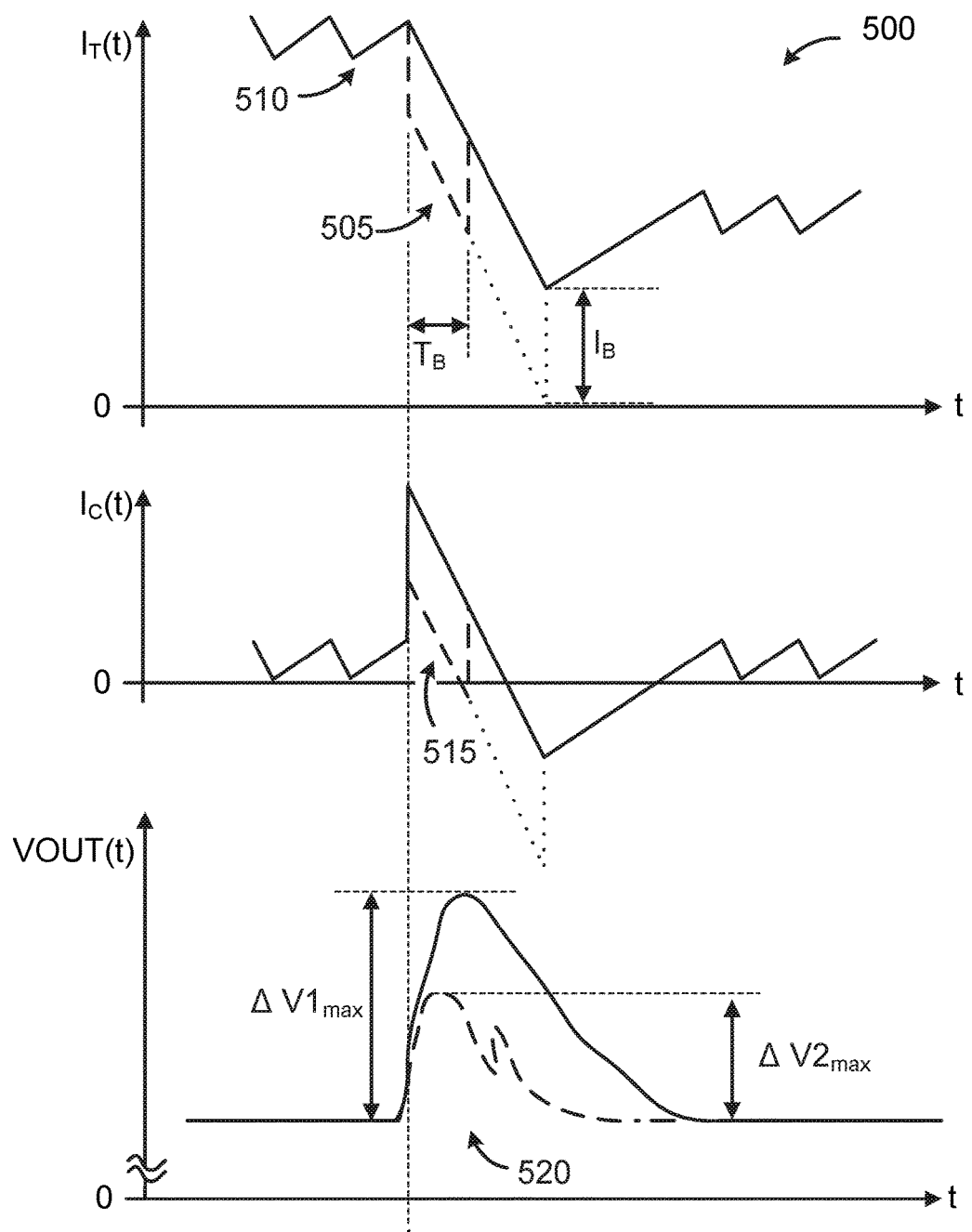
FIG. 5 depicts an exemplary set of waveforms illustrating control of current through a three-quarter bridge (TQB) during a step-down transient unloading event.

FIG. 5 depicts an exemplary set of waveforms illustrating control of current through a three-quarter bridge (TQB) during a step-down transient unloading event. A set of waveforms 500 includes (with reference to FIG. 1) a total power supply current $I_T(t)$, a capacitor current $I_C(t)$ and an output voltage supply VOUT(t) of a switch-mode power supply circuit, such as the switch-mode power supply circuit 100 (FIG. 1), with an integrated TQB, such as the bypass switch 105 (FIG. 1).

The step-down transient loading event may be a sudden and substantially large step decrease in load current. The switch-mode power supply reaction to the step-down transient load is depicted in FIG. 5, where the load step occurs at $t_0$.

As shown in the depicted exemplary set of waveforms 500, the bypass switch 105 is controlled to turn on a bypass current $I_B(t)$ 505. The bypass current 505 subtracts from an inductor current $I_L(t)$ 510 to produce a total current $I_T(t)$. The bypass switch 105 is controlled to turn on the bypass current 505 for a controlled amount of bypass on-time $T_B$. As depicted in the capacitor current $I_C(t)$ waveform, the capacitor C1 (FIG. 1) receives at least a portion 515 of the bypass current 505. As depicted in the output voltage supply VOUT(t) waveform, the output voltage raises in response to the excess capacitor current supplying the transient step-up load. Without the bypass switch 105, the output voltage supply VOUT raises by, for example, $\Delta V1$ max. With the bypass switch 105, the output voltage supply VOUT raises by, for example, $\Delta V2_{max}$. Accordingly, the addition of the bypass current $I_B(t)$ 505 to the total current $I_T(t)$ may advantageously reduce the magnitude of a transient response 520.

Figure 6:
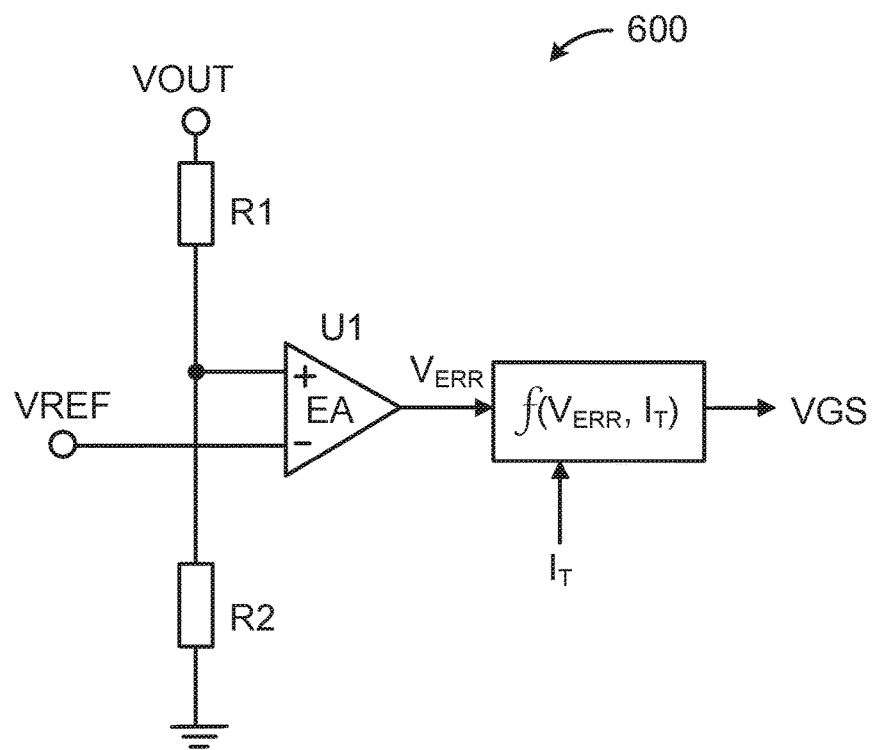
FIG. 6 depicts an exemplary bypass switch VGS voltage control circuit.

FIG. 6 depicts an exemplary bypass switch VGS voltage control circuit. A VGS voltage control circuit 600 includes an error amplifier U1. The error amplifier U1 produces an error voltage $V_{ERR}$. The error voltage $V_{ERR}$ is produced from the difference of an output voltage VOUT and a reference voltage signal VREF, both coupled to the inputs of the error amplifier U1. VGS may be determined by a formula or look-up table as a function of the error voltage VERR. In some examples, VGS may be determined by a formula or look-up table as a function of the total current (e.g., load current). In various examples, VGS may be determined by a formula or look-up table as a function of the power, for example, $f(V_{ERR}, I_T)$.

In some examples, R1 and R2 may be removed from this circuit and U1 may simply look at the value of VOUT −VREF. In various examples, the circuit shown in FIG. 6 may be inside the controller 120, so there may be communication between the controller and driver for the bypass switch. In some implementations, the controller may determine the level of Vgs as a command, and the driver may create this level and applies it to the switches Q3/Q4.

Figure 7:
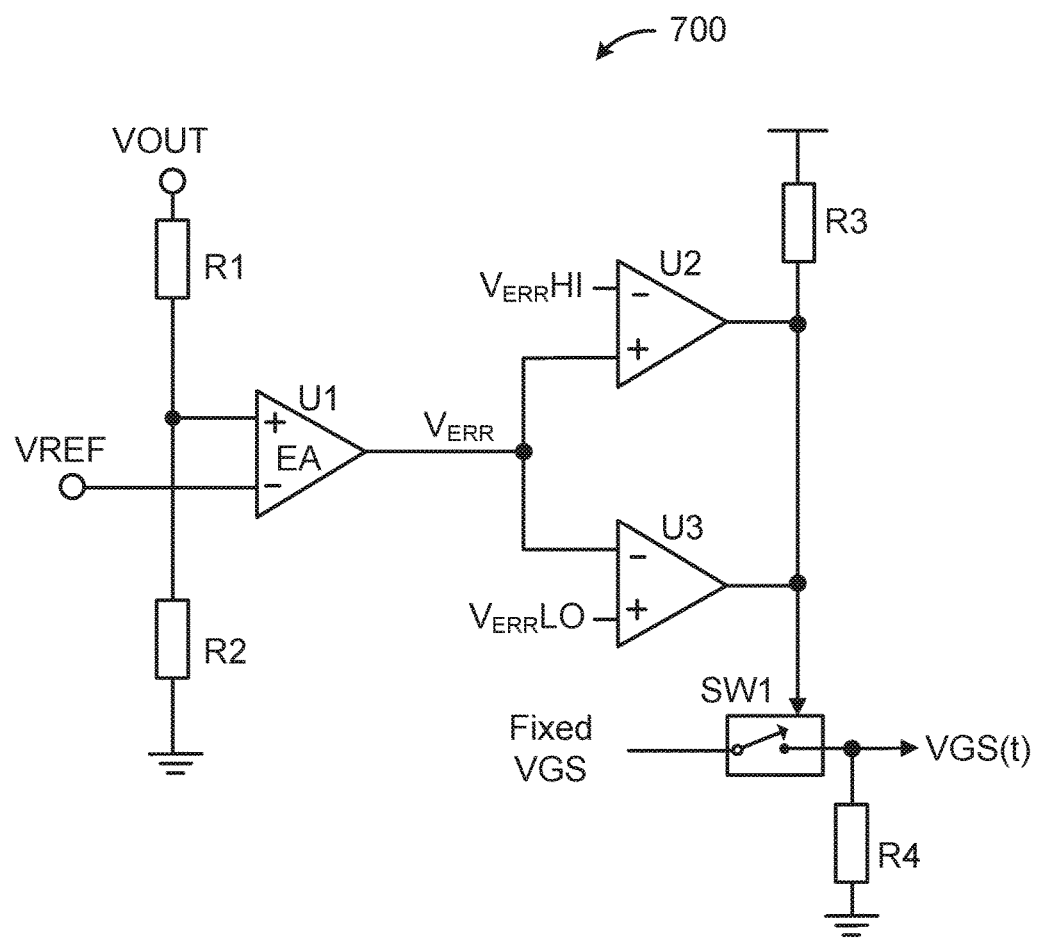
FIG. 7 depicts an exemplary bypass switch on-time control circuit.

FIG. 7 depicts an exemplary bypass switch on-time control circuit. A bypass switch on-time control circuit 700 includes an error amplifier U1. The error amplifier U1 produces an error voltage $V_{ERR}$. The error voltage $V_{ERR}$ is produced from the difference of an output voltage VOUT and a reference voltage signal VREF, both coupled to the inputs of the error amplifier U1. The error voltage VERR is coupled to a window comparator made up of comparators U2 and U3 and resistor pullup R3.

When an error voltage $V_{ERR}$ is below a predetermined $V_{ERR}HI$ threshold and above a predetermined $V_{ERR}LO$ threshold, a fixed VGS may be gated off via a switch/gate SW1. When an error voltage $V_{ERR}$ is above a predetermined $V_{ERR}HI$ threshold or below a predetermined $V_{ERR}LO$ threshold, a fixed VGS may be gated on via the switch/gate SW1.

Various implementations may control the on-time of a bypass switch by monitoring the slope of an output voltage VOUT. For example, when the output voltage VOUT reaches a predefined slope, a fixed VGS may be gated on. In some examples, when the output voltage VOUT reaches an inflection point, the VGS signal may be turned off. In some examples, the on-time may be a constant predefined time.

Figure 8:
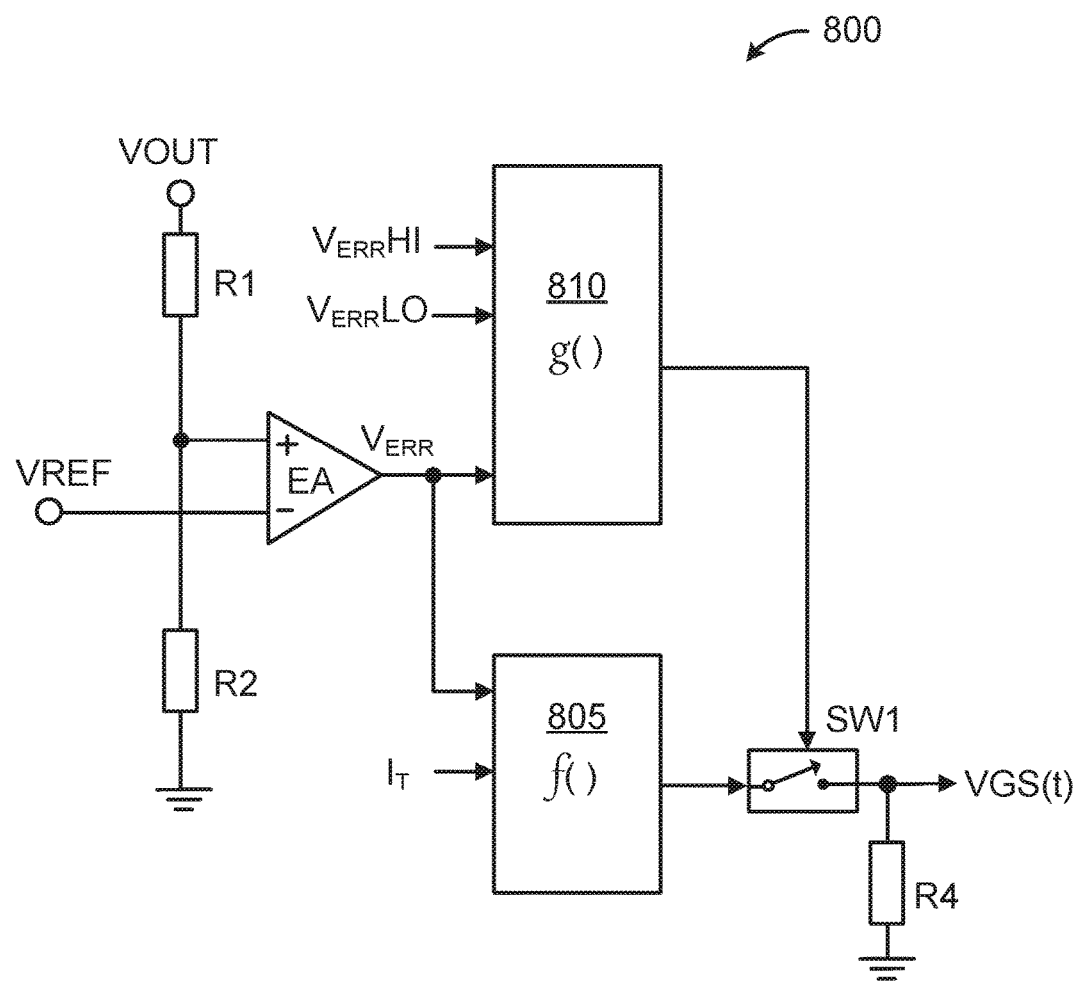
FIG. 8 depicts an exemplary aggregated bypass switch VGS voltage and on-time control circuit.

FIG. 8 depicts an exemplary aggregated bypass switch VGS voltage and on-time control circuit. An aggregated bypass switch VGS voltage and on-time control circuit 800 includes an error amplifier U1. The error amplifier U1 produces an error voltage $V_{ERR}$. The error voltage $V_{ERR}$ is produced from the difference of an output voltage VOUT and a reference voltage signal VREF, both coupled to the inputs of the error amplifier U1.

The error voltage $V_{ERR}$ and a power supply current $I_T$ are coupled to the input of an f( ) function block 805. The f( ) function block 805 produces an output based on the function $f(V_{ERR}, I_T)$, for example. The output of the f( ) function block 805 is fed to an input of a switch SW1. The switch SW1 is controlled by an output of a go function block 810. The go function block 810 produces an output based on the function $g(V_{ERR}, V_{ERR}HI, V_{ERR}LO)$, for example. The go function block 810 receives inputs $V_{ERR}, V_{ERR}HI, V_{ERR}LO$. Accordingly, the exemplary aggregated bypass switch VGS voltage and on-time control circuit 800 may control the magnitude and on-time of a VGS voltage signal VGS(t) to various bypass switches.

Figure 9:
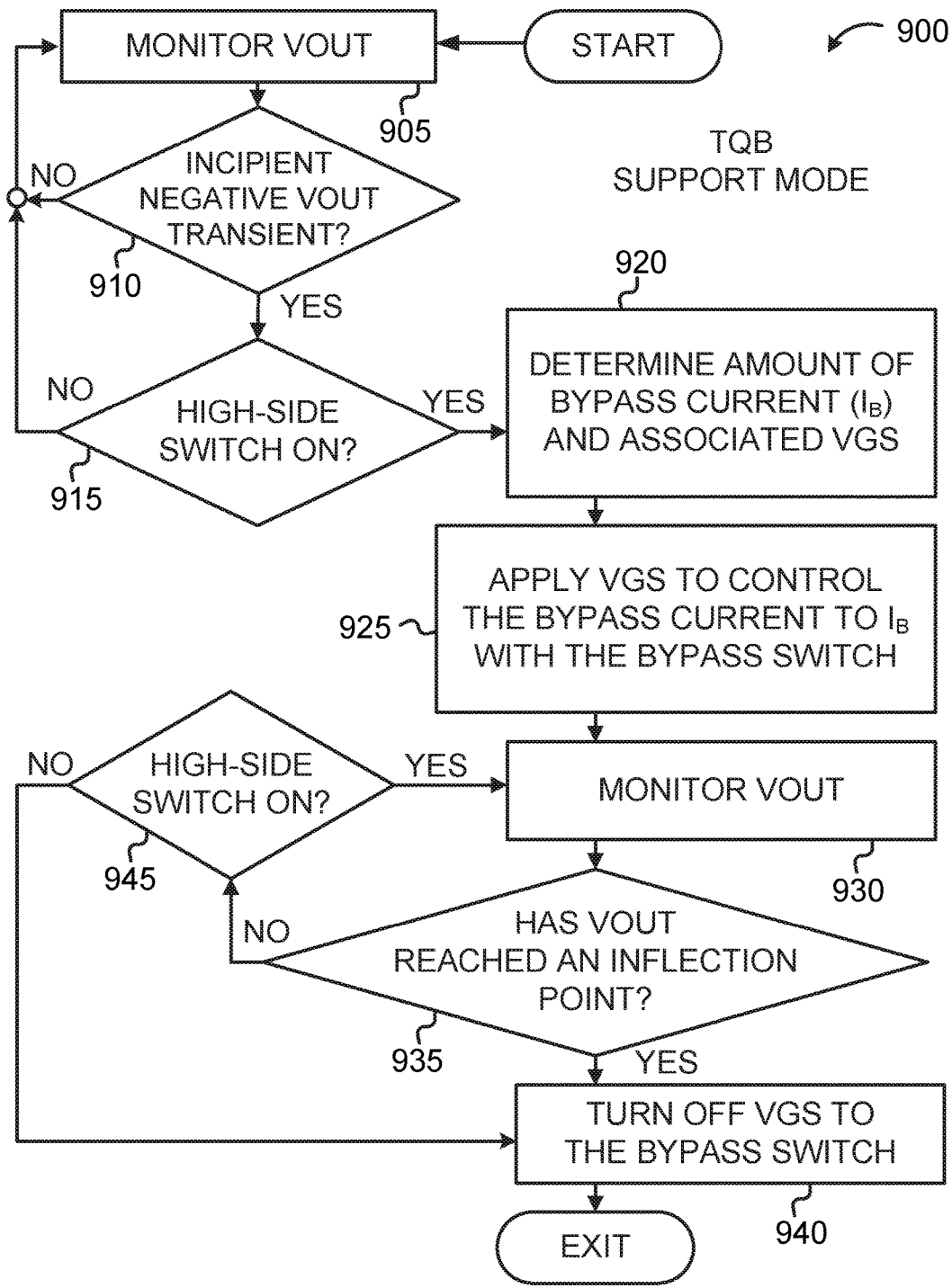
FIG. 9 depicts an exemplary TQB support mode control method.

FIG. 9 depicts an exemplary TQB support mode control method. A TQB support mode method 900 may be employed, for example, within the bypass switch compensation controller 220 (FIG. 2). The TQB support mode method 900 begins at process block 905. At process block 905 the process 900 monitors an output voltage VOUT. The output voltage VOUT may be the output of a switch-mode power supply, for example, the switch-mode power supply circuit 100 (FIG. 1). Execution continues to decision block 910. At decision block 910, the process 900 determines an incipient negative transient on the output voltage supply VOUT. If there is no incipient negative transient on the output voltage supply VOUT, then execution jumps back to process block 905. If there is an incipient negative transient on the output voltage supply VOUT, then execution continues to decision block 915. At decision block 915, the process determines the state of a high-side switch, for example, the high-side switch Q1 (FIG. 1). If the high-side switch is not on, then execution jumps back to process block 905. If the high-side switch is on, then execution continues to process block 920 where the TQB support mode control method 900 begins to provide additional current through the bypass switch.

At process block 920, the process 900 determines an amount of bypass current to control through the bypass switch to mitigate the negative transient on the output voltage supply VOUT. The amount of bypass current determined is associated with a control voltage VGS that may be applied to the control gates on the FETs in the bypass switch, for example, FETs Q3 and Q4 (FIG. 1). Various look-up tables, formulas and/or functions that may be suitable for determining the amount of bypass current $I_B$ and associated VGS to apply to the control gates on the FETs in the bypass switch are described with reference to FIGS. 6-8, and are described by way of example and not limitation. Upon completion of process block 920, execution continues to process block 925.

At process block 925, the process 900 applies the determined VGS from process block 920 to the control gates of the FETs within the bypass switch to control the bypass current $I_B$. Execution continues to process block 930. At process block 930, the process 900 monitors the output voltage supply VOUT. Execution continues to decision block 935.

At decision block 935, if the output voltage VOUT has reached an inflection point, for example, the output voltage VOUT is no longer dropping, but is beginning to level off in preparation for an incipient positive voltage excursion, then execution continues to process block 940. At process block 940 the process 900 turns off the control voltage VGS to the bypass switch. This removal of control voltage VGS from the bypass switch terminates the supporting bypass current $I_B$ through the bypass switch. The process 900 is then exited.

If, at decision block 935, the output voltage VOUT has not reached an inflection point, then execution continues to decision block 945. At decision block 945, the process determines the state of the high-side switch. If the high-side switch is not on, then execution jumps to process block 940 to turn off the bypass switch and exit the process 900. If the high-side switch is on, then execution jumps back to process block 930. Accordingly, execution of blocks 930, 935 and 945 provides the process 900 with a waiting function, to wait for a qualification of either reaching an inflection point on output voltage VOUT or a high-side switch shut off, in order to terminate the support mode by turning off the bypass current.

It will be recognized that at decision blocks 910 and 935 various other detection methods may be employed. For example, a positive result may be the outcome of the decision blocks 910 and 935 when output voltage VOUT drops below a predetermined threshold or a predetermined error voltage $V_{ERR}$ threshold as described with reference to FIGS. 6-8.

In some examples, step 920 reflects the Vgs control. In some operational modes, steps 920 and 925 may be optional or removed, which may mean that the bypass is turned on and Vgs is fixed. Therefore, in one option, the steps of a method may include just turning the bypass on with a fixed Vgs and going straight to step 930 (e.g., skipping or removing steps 920 and 925).

Figure 10:
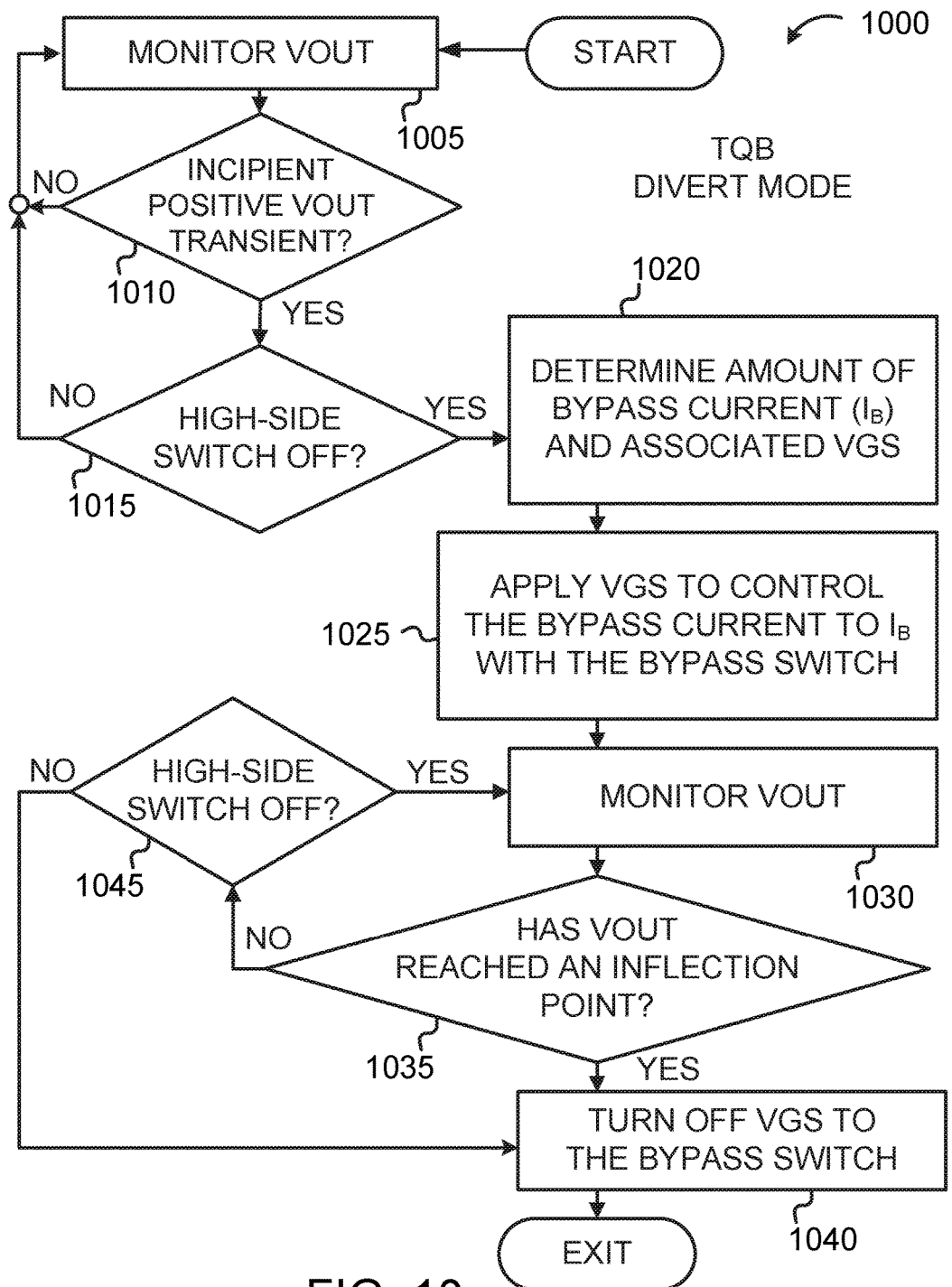
FIG. 10 depicts an exemplary TQB divert mode control method.

FIG. 10 depicts an exemplary TQB divert mode control method. A TQB divert mode method 1000 may be employed, for example, within the bypass switch compensation controller 220 (FIG. 2). The TQB divert mode method 1000 begins at process block 1005. At process block 1005 the process 1000 monitors an output voltage supply VOUT. The output voltage supply VOUT may be the output of a switch-mode power supply, for example, the switch-mode power supply 100 (FIG. 1). Execution continues to decision block 1010. At decision block 1010, the process 1000 determines an incipient positive transient on output voltage VOUT. If there is no incipient positive transient on output voltage VOUT, then execution jumps back to process block 1005. If there is an incipient positive transient on output voltage VOUT, then execution continues to decision block 1015. At decision block 1015, the process determines the state of a high-side switch, for example, the high-side switch Q1 (FIG. 1). If the high-side switch is not off, then execution jumps back to process block 1005. If the high-side switch is off, then execution continues to process block 1020 where the TQB divert mode control method 1000 begins to divert current through the bypass switch and away from the power supply output.

At process block 1020, the process 1000 determines an amount of bypass current to control through the bypass switch to mitigate the positive transient on output voltage VOUT. The amount of bypass current determined is associated with a control voltage VGS that may be applied to the control gates on the FETs in the bypass switch, for example, FETs Q3 and Q4 (FIG. 1). Various look-up tables, formulas and/or functions that may be suitable for determining the amount of bypass current $I_B$ and associated VGS to apply to the control gates on the FETs in the bypass switch are described with reference to FIGS. 6-8, and are described by way of example and not limitation. Upon completion of process block 1020, execution continues to process block 1025.

At process block 1025, the process 1000 applies the determined VGS from process block 1020 to the control gates of the FETs within the bypass switch to control the bypass current $I_B$. Execution continues to process block 1030. At process block 1030, the process 1000 monitors the output voltage VOUT. Execution continues to decision block 1035.

At decision block 1035, if output voltage VOUT has reached an inflection point, for example, the output voltage VOUT is no longer rising, but is beginning to level off in preparation for an incipient negative voltage excursion, then execution continues to process block 1040. At process block 1040 the process 1000 turns off the control voltage VGS to the bypass switch. This removal of control voltage VGS from the bypass switch terminates the circulating bypass current $I_B$ through the bypass switch. The process 1000 is then exited.

If, at decision block 1035, the output voltage VOUT has not reached an inflection point, then execution continues to decision block 1045. At decision block 1045, the process determines the state of the high-side switch. If the high-side switch is not off, then execution jumps to process block 1040 to turn off the bypass switch and exit the process 1000. If the high-side switch is off, then execution jumps back to process block 1030. Accordingly, execution of blocks 1030, 1035 and 1045 provides the process 1000 with a waiting function, to wait for a qualification of either reaching an inflection point on output voltage VOUT or a high-side switch turned on, in order to terminate the divert mode by turning off the bypass current.

It will be recognized that at decision blocks 1010 and 1035 various other detection methods may be employed. For example, a positive result may be the outcome of the decision blocks 1010 and 1035 when output voltage VOUT rises above a predetermined threshold or a predetermined error voltage $V_{ERR}$ threshold as described with reference to FIGS. 6-8.

In some examples, step 1020 reflects the Vgs control. In some operational modes, steps 1020 and 1025 may be optional or removed, which may mean that the bypass is turned on and Vgs is fixed. Therefore, in one option, the steps of a method may include just turning the bypass on with a fixed Vgs and going straight to step 1030 (e.g., skipping or removing steps 1020 and 1025).

Figure 11:
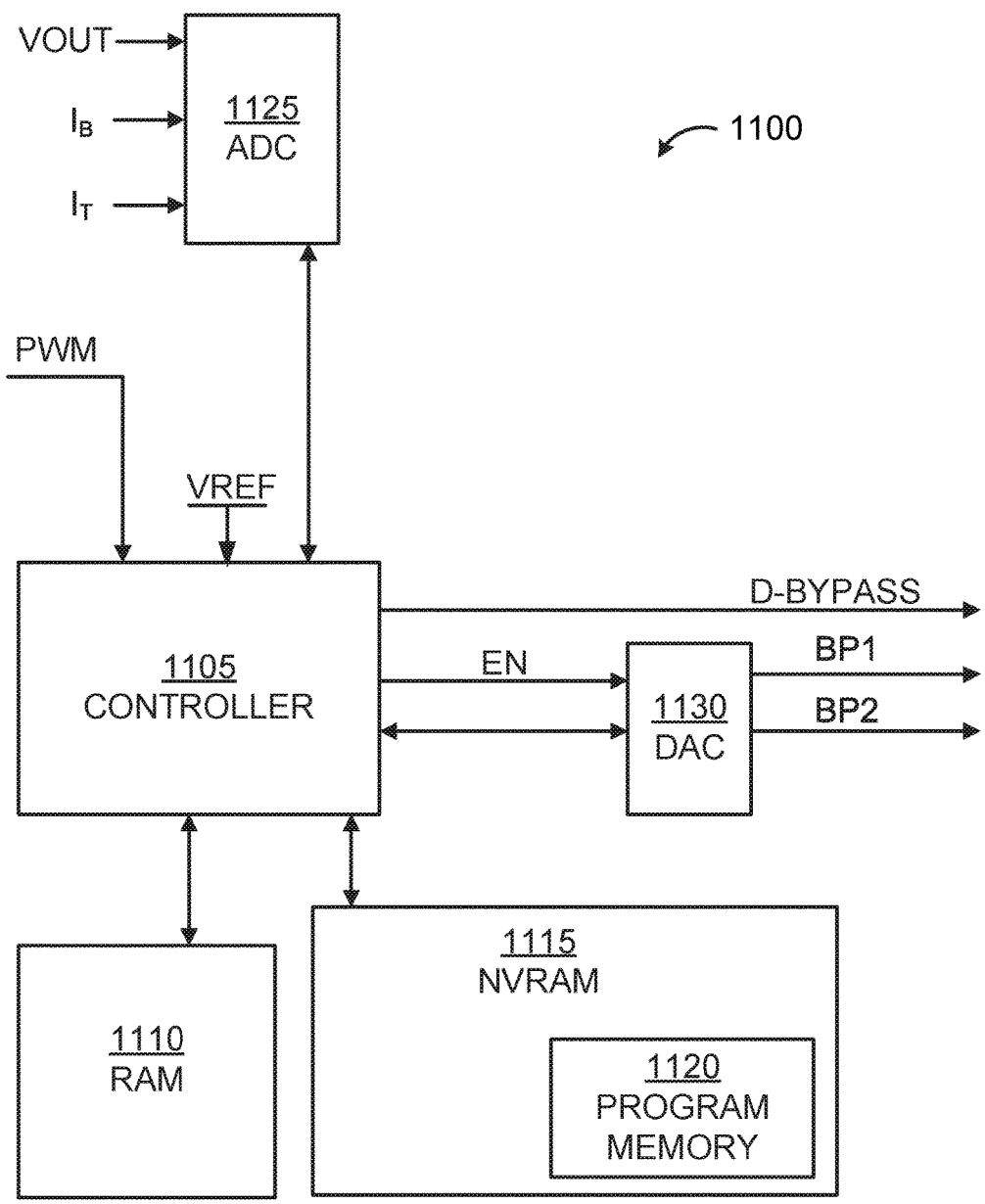
FIG. 11 depicts a block diagram of TQB control system.

FIG. 11 depicts a block diagram of a bypass switch control system. A bypass switch control system 1100 maybe employed in various bypass switch compensation controllers, for example, in the bypass switch compensation controller 220 in FIG. 2. The bypass switch control system 1100 includes a controller 1105. The controller 1105 is operably coupled via a data/control bus to a random-access memory (RAM) 1110. The RAM 1110 may facilitate basic functionality of the controller 1105. The controller 1105 is operably coupled to a non-volatile random-access memory (NVRAM) 1115. The NVRAM 1115 includes a program memory 1120. The program memory may provide the controller 1105 preprogrammed instructions for execution.

The controller 1105 receives a PWM signal. The PWM signal may be generated by a logic circuit, such as the logic circuit 210 (FIG. 2). The controller 1105 may use the PWM signal to qualify a control signal to a bypass switch. For example, during a transient step-up loading event the controller 1105 may turn on the bypass switch only when the PWM signal is activated. Similarly, during a transient step-down unloading event the controller 1105 may turn on the bypass switch only when the PWM signal is deactivated.

The controller 1105 receives a reference voltage signal VREF. The reference voltage signal VREF may be used by the controller to determine when, for example, the output voltage and/or an error voltage is below a predetermined threshold. In some examples, the reference voltage signal VREF may be read by an analog-to-digital converter ADC 1125. In the depicted example, the ADC 1125 samples and converts analog input signals to a digital number. The analog input signals sampled and converted by the ADC include an output voltage VOUT, a bypass current $I_B$, and total current $I_T$, which may be indicative of an output load current.

The controller 1105 generates the bypass switch compensation drive signal D-BYPASS, which may be a duty cycle correction signal. The duty cycle correction signal may be combined with a feed forward correction signal and a buck regulation PWM output signal to mitigate output voltage transient excursions. The controller 1105 generates the TQB bypass signals BP1 and BP2 via a digital-to-analog converter DAC 1130. In some implementations, the DAC 1130 may be implemented and/or integrated with the controller 1105. Accordingly, the controller 1105 determines a TQB correction value based on inputs VOUT, IB, IT and/or VREF and writes a digital value to the DAC 1130 to control a TQB support or a TQB diversion current. The controller 1105 generates an enable signal EN. The enable signal EN may turn the bypass switch on and off.

Although various embodiments have been described with reference to the Figures, other embodiments are possible. For example, a bypass current $I_B$ may be determined in an analog or in a digital domain by employment of an analog-to-digital converter ADC and/or a digital-to-analog converter DAC. Various control methods of buck regulation circuits with various TQBs may advantageously employ feed-forward control adjustments, may employ current sensing methods and overcurrent protection (OCP), and/or achieve fast transient response.

Various examples may include a method of operating a buck-derived power supply (BDPS) with a three-quarter bridge (TQB) configuration. The method of operating may include providing the BDPS. The BDPS may include an input terminal configured to provide an input voltage source, an output terminal configured to drive a load, an inductor electrically coupled between the input terminal and the output terminal, a main switch electrically coupled between the input terminal and the output terminal and operative to selectively connect the input terminal to an intermediate switch node, a rectifier electrically coupled to the intermediate switch node, and a bypass switch electrically connected between the intermediate switch node and the output terminal and in parallel with the inductor, for example.

The method may include providing a controller operative to control the main switch and the bypass switch and configured to provide a pulse width modulated (PWM) signal to control the main switch. The method may include, during a step-up transient load event, causing the BDPS to enter a boost mode comprising simultaneously activating the main switch and the bypass switch. The method may include exiting the boost mode. The method may include, in response to exiting the boost mode upon a decrease in load current, performing a duty cycle correction comprising adjusting a duty cycle of the PWM signal applied to the main switch in the next period of the PWM signal following the decrease in load current. In some examples, adjusting a duty cycle of the PWM signal in response to exiting the boost mode includes increasing the duty cycle of the PWM signal applied to the main switch by a predetermined amount on the next period. In some examples, adjusting a duty cycle of the PWM signal in response to exiting the boost mode comprises decreasing the duty cycle of the PWM signal applied to the main switch by a predetermined amount on the next period. In various embodiments, the method includes, in the boost mode, combining a bypass current IB passing through the bypass switch with an inductor current IL passing through the inductor to support an output voltage VOUT at the output terminal.

In some embodiments, the bypass switch comprises a first semiconductor switch (Q3) having a first control gate and a second semiconductor switch (Q4) having a second control gate, the first and second semiconductor switches being connected in anti-series. In some examples, performing a duty cycle correction includes applying a gain factor (Kg) to perform at least one of shrinking and expanding of the PWM signal. The method, in some examples, includes adjusting a bypass current IB passing through the bypass switch in the boost mode by applying a gate-to-source voltage (Vgs) to the bypass switch according to a predetermined current characteristic of the bypass switch. The method may include adjusting a bypass current IB passing through the bypass switch in the boost mode by varying an on time (TB) of the bypass switch. The method may include estimating a bypass current IB passing through the bypass switch as a function of a gate-to-source voltage (Vgs) of the bypass switch. The method may include sensing a bypass current IB passing through the bypass switch by performing integrated current sensing using a current mirror of the bypass switch.

In some embodiments the method may include, during a step-down transient unloading event, causing the BDPS to enter a sink mode that includes simultaneously activating the bypass switch and deactivating the main switch. The method may include exiting the sink mode. The method may include, in response to exiting the sink mode upon an increase in load current, adjusting the duty cycle of the PWM signal applied to the main switch in the next period of the PWM signal following the increase in load current. In some examples, adjusting a duty cycle of the PWM signal in response to exiting the sink mode includes increasing the duty cycle of the PWM signal applied to the main switch by a predetermined amount on the next period. In some examples, adjusting a duty cycle of the PWM signal in response to exiting the sink mode includes decreasing the duty cycle of the PWM signal applied to the main switch by a predetermined amount on the next period. In various embodiments, the method includes, in the sink mode, circulating through the bypass switch at least a portion of the inductor current IL.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method of operating a buck-derived power supply (BDPS) with a three-quarter bridge (TQB) configuration, the method comprising:
    providing the BDPS comprising:
        an input terminal configured to provide an input voltage source;
        an output terminal configured to drive a load;
        an inductor electrically coupled between the input terminal and the output terminal;
        a main switch electrically coupled between the input terminal and the output terminal and operative to selectively connect the input terminal to an intermediate switch node;
        a freewheeling rectifier electrically coupled to the intermediate switch node; and,
        a bypass switch electrically connected between the intermediate switch node and the output terminal and in parallel with the inductor;
    providing a controller operative to control the main switch and the bypass switch and configured to provide a pulse width modulated (PWM) signal to control the main switch;
    during a step-up transient load event, causing the BDPS to enter a boost mode comprising simultaneously activating the main switch and the bypass switch;
    exiting the boost mode; and,
    in response to exiting the boost mode upon a decrease in load current, performing a duty cycle correction comprising adjusting a duty cycle of the PWM signal applied to the main switch in the next period of the PWM signal following the decrease in load current.

2. The method of claim 1, further comprising, in the boost mode, combining a bypass current $I_B$ passing through the bypass switch with an inductor current $I_L$ passing through the inductor to support an output voltage VOUT at the output terminal.

3. The method of claim 1, wherein performing a duty cycle correction further comprises applying a gain factor ($K_g$) to perform at least one of shrinking and expanding of the PWM signal.

4. The method of claim 1, further comprising adjusting a bypass current $I_B$ passing through the bypass switch in the boost mode by applying a gate-to-source voltage ($V_gs$) to the bypass switch according to a predetermined current characteristic of the bypass switch.

5. The method of claim 1, further comprising adjusting a bypass current $I_B$ passing through the bypass switch in the boost mode by varying an on time ($T_B$) of the bypass switch.

6. The method of claim 1, further comprising estimating a bypass current $I_B$ passing through the bypass switch as a function of a gate-to-source voltage ($V_{gs}$) of the bypass switch.

7. The method of claim 1, further comprising sensing a bypass current $I_B$ passing through the bypass switch by performing integrated current sensing using a current mirror of the bypass switch.

8. The method of claim 1, further comprising:
    during a step-down transient unloading event, causing the BDPS to enter a sink mode comprising simultaneously activating the bypass switch and deactivating the main switch;
    exiting the sink mode; and,
    in response to exiting the sink mode upon an increase in load current, adjusting the duty cycle of the PWM signal applied to the main switch in the next period of the PWM signal following the increase in load current.

9. The method of claim 8, further comprising, in the sink mode, circulating through the bypass switch at least a portion of an inductor current $I_L$.

10. The method of claim 1, wherein the controller comprises a buck regulation control circuit configured to generate a drive signal D that depends on at least one of the input voltage source, an output voltage at the output terminal, and a total current $I_T$ equal to the sum of an inductor current $I_L$ passing through the inductor and a bypass current $I_B$ passing through the bypass switch.

11. The method of claim 10, wherein the controller further comprises a logic circuit, a feed forward circuit, and a bypass switch compensation controller operably coupled together to generate the PWM signal to drive the main switch and the freewheeling rectifier, and at least one bypass signal BP1, BP2 to drive the bypass switch.

12. The method of claim 11, wherein the logic circuit is:
    operably coupled to the feed forward circuit to receive a feed-forward drive signal D-FF that is a function of the input voltage source VIN and a reference voltage VREF,
    operably coupled to the buck regulation control circuit to receive the drive signal D, operably coupled to the bypass switch compensation controller to receive a bypass switch compensation drive signal D-BYPASS; and, configured to generate the PWM signal as a function of at least one of the feed-forward drive signal D-FF, the drive signal D, and the bypass switch compensation drive signal D-BYPASS.

13. The method of claim 12, wherein:

the bypass switch compensation controller is operably coupled to receive the output voltage at the output terminal, the total current $I_T$, and the bypass current $I_B$, and, the feed-forward circuit is operably coupled to receive the input voltage source.

14. The method of claim 13, wherein the bypass switch compensation controller is operatively coupled to the logic circuit to receive the PWM signal from the logic circuit.

15. The method of claim 14, wherein the bypass switch compensation controller is configured to generate the at least one bypass signal BP1, BP2 in response to the received PWM signal from the logic circuit.

16. The method of claim 15, wherein the bypass switch comprises a first semiconductor switch (Q3) having a first control gate and a second semiconductor switch (Q4) having a second control gate, the first and second semiconductor switches being connected in anti-series, and wherein a bypass driver receives the at least one bypass signal BP1, BP2 to generate a first bypass drive signal DRV-BP1 to drive the first control gate and a second bypass drive signal DRV-BP2 to drive the second control gate.

17. A control circuit for controlling a buck-derived power supply (BDPS) with a three-quarter bridge (TQB) configuration including a high side switch connected between an input terminal and an intermediate switch node, a low side switch connected between the intermediate switch node and ground, and an inductor and a bypass switch connected in parallel between the intermediate switch node and an output terminal, wherein the control circuit comprises:

a bypass switch compensation controller configured to generate a set of bypass drive signals to control a bypass driver circuit to drive the bypass switch; and, a buck regulation control circuit configured to generate a drive signal D to feed a logic circuit to control a switch-mode driver circuit to drive the high side switch and the low side switch.

18. The control circuit of claim 17, further comprising a feed-forward circuit configured to provide a feed-forward drive signal D-FF to feed the logic circuit.

19. The control circuit of claim 18, wherein the logic circuit is further configured to receive a bypass switch compensation drive signal D-BYPASS generated by the bypass switch compensation controller.

20. The control circuit of claim 17, wherein the bypass switch compensation controller is configured to receive (1) an output voltage sense signal indicative of output voltage supply VOUT at the output terminal, (2) an output signal generated by the logic circuit, (3) a bypass current sense signal indicative of a bypass current $I_B$, (4) a total current sense signal $I_T$ indicative of a load demand of a supplied load, and (5) a reference voltage signal VREF.

* * * * *